UNITED STATES PATENT OFFICE.

ALVAH W. ESTABROOK, OF KANSAS CITY, MISSOURI, ASSIGNOR TO THE LARABEE FLOUR MILLS COMPANY, OF HUTCHINSON, KANSAS, A CORPORATION OF KANSAS.

DRY-SHORTENING FLOUR.

1,117,012.      Specification of Letters Patent.      Patented Nov. 10, 1914.

No Drawing.      Application filed November 24, 1913. Serial No. 802,742.

*To all whom it may concern:*

Be it known that I, ALVAH W. ESTABROOK, a citizen of the United States, residing in Kansas City, in the county of Jackson and State of Missouri, have invented new and useful Improvements in Dry-Shortening Flour, of which the following is a specification.

This invention relates to a new and useful product for edible purposes, and comprises essentially wheat flour mixed with a comminuted dry substance of the character hereinafter described, which product, when made into a dough by the addition of milk or water, and baked, will be shortened by said substance.

The present invention relates more particularly to the substance employed for producing the shortening function, which substance I have ascertained to possess many desirable attributes in its use in providing a self-shortening flour. The substance referred to may be described as a hardened oil, a product which has only recently come into commercial use. While various oils of this type may be used, the hardened oil I prefer is that produced from cotton seed oil.

The hardened oil is made according to the following process: The cotton seed oil is first heated and nickel salt is added thereto. Hydrogen is then conducted into the oil, and the heat is continued and the mass stirred constantly. The nickel salt acts as a catalyzer, causing the oleic acid of the oil to take up an atom of hydrogen, whereby it is changed into stearic acid. When the process of hydrogenation has progressed far enough to give the mass the desired hardness, which is ascertained by making a titer test, the melted fat is filtered off from the nickel and allowed to cool. The product thus obtained will be much harder than natural hard fats, and due to the changes produced in the process of hydrogenation it will keep for an indefinite length of time without becoming rancid. This is due to the fact that the linolein of the oil, which is the element in all edible fats which tends to produce rancidity, is changed by the process into stearin. Freedom from rancidity is also due, in a large measure, to the fact that the hardened oil contains practically no olein, which is a liquid fat, practically all of the oleic acid of the oil being converted to stearic acid by the process described; and any palmatin which may be present will be unobjectionable for the reason that this is a solid and lends itself readily to the purposes of the present invention. The hardened oil may be finely ground and mixed with flour, and when so ground and mixed it is hard enough to remain distinct from the flour, so that while both are in the dry state it will not modify, or itself be modified by the flour.

In practice I have found for the purposes of making biscuit or a similar product, that about twelve pounds of the comminuted hardened oil should be mixed with about two hundred pounds of flour, although, of course, the proportions may be varied within reasonable limits. The product, as a whole, may be sacked or barreled, for commercial purposes, and, as indicated above, may be kept for an indefinite length of time without material deterioration. In addition to the powdered hardened oil I may also add to the flour baking powder, or other leavening mixtures, and seasoning, so that for cooking purposes it will only be necessary to make a dough of the product by adding thereto milk or water, and rolling it into a relatively thin mass, then cutting into biscuits and baking.

For making pie crust, or similar types of pastry, the amount of hardened oil added to the flour would be about twenty-four pounds of the hardened oil to two hundred pounds of flour, and, of course, the leavening agent would be omitted. In making the ordinary bakers' bread the proportion would be about five pounds of the comminuted hardened oil to two hundred pounds of flour. I prefer, however, to produce the product as a biscuit flour having leavening and seasoning ingredients incorporated therein.

I claim:

1. Wheat flour having mixed therewith in the dry state a comminuted hardened oil.

2. Wheat flour having mixed therewith in the dry state a comminuted hardened oil produced from cotton seed oil.

3. Wheat flour having mixed therewith in the dry state a comminuted hardened oil, and leavening and seasoning agents.

4. Wheat flour having mixed therewith in the dry state a comminuted hardened oil produced from cotton seed oil, and leavening and seasoning agents.

5. An article of food in the raw state comprising a comminuted hardened oil.

6. An article of food in the raw state comprising a comminuted hardened oil produced from cotton seed oil.

In testimony whereof, I have hereunto set my hand in presence of two subscribing witnesses.

ALVAH W. ESTABROOK.

Witnesses:
  BRUCE S. ELLIOTT,
  STELLA HILL.